(12) United States Patent
Neustrom et al.

(10) Patent No.: US 10,579,465 B1
(45) Date of Patent: Mar. 3, 2020

(54) SYSTEMS AND METHODS FOR SELF CORRECTING SECURE COMPUTER SYSTEMS

(71) Applicants: Joshua Neustrom, Kansas City, MO (US); Edward Neustrom, Kansas City, MO (US)

(72) Inventors: Joshua Neustrom, Kansas City, MO (US); Edward Neustrom, Kansas City, MO (US)

(73) Assignee: Keep Security LLC, Kansas City, MO (US)

( * ) Notice: Subject to any disclaimer, the term of this patent is extended or adjusted under 35 U.S.C. 154(b) by 128 days.

(21) Appl. No.: 15/939,496

(22) Filed: Mar. 29, 2018

(51) Int. Cl.
*G06F 11/00* (2006.01)
*G06F 11/07* (2006.01)
*G06F 9/4401* (2018.01)

(52) U.S. Cl.
CPC ........ *G06F 11/0793* (2013.01); *G06F 9/4416* (2013.01); *G06F 11/0721* (2013.01); *G06F 2213/0042* (2013.01)

(58) Field of Classification Search
CPC .................. G06F 11/0793; G06F 11/0721
See application file for complete search history.

(56) References Cited

U.S. PATENT DOCUMENTS

| | | | |
|---|---|---|---|
| 6,763,456 B1 | 7/2004 | Agnihotri et al. | |
| 6,934,881 B2 | 8/2005 | Gold et al. | |
| 7,111,201 B2 | 9/2006 | Largman et al. | |
| 7,137,034 B2 | 11/2006 | Largman et al. | |
| 7,395,394 B2 | 7/2008 | Federa et al. | |
| 7,467,326 B2 | 12/2008 | Hillman et al. | |
| 8,468,334 B1 | 6/2013 | Jonna et al. | |
| 8,516,186 B2 | 8/2013 | Fukui et al. | |
| 8,543,764 B2 | 9/2013 | Jevans et al. | |
| 8,566,574 B2 | 10/2013 | Shriver | |
| 8,583,770 B2 | 11/2013 | Van Riel | |
| 9,268,667 B2 | 2/2016 | Chen et al. | |
| 9,507,584 B2 | 11/2016 | Tsuji et al. | |
| 9,804,869 B1 | 10/2017 | Wang et al. | |
| 9,824,220 B2 | 11/2017 | Baentsch et al. | |
| 2007/0234032 A1* | 10/2007 | Chen | G06F 13/385 713/100 |
| 2007/0288938 A1* | 12/2007 | Zilavy | G06F 9/5061 719/327 |
| 2009/0089865 A1* | 4/2009 | Baron | G06F 21/6209 726/6 |
| 2012/0239918 A1 | 9/2012 | Huang | |

(Continued)

FOREIGN PATENT DOCUMENTS

| | | |
|---|---|---|
| EP | 1244951 A2 | 10/2002 |
| WO | 02054234 A1 | 7/2002 |
| WO | 2007092750 A2 | 8/2007 |

*Primary Examiner* — Bryce P Bonzo
*Assistant Examiner* — Katherine Lin
(74) *Attorney, Agent, or Firm* — Armstrong Teasdale LLP

(57) ABSTRACT

A self-correcting secure computer system is provided. The computer system includes a read-only memory (ROM) device, a random access memory (RAM) device, and at least one processor in communication with the ROM device and the RAM device. The at least one processor is programmed to receive an activation signal, retrieve, from the ROM device, data to execute an operating system, and execute, on the RAM device, the operating system based on the data from the ROM device.

20 Claims, 5 Drawing Sheets

(56) References Cited

U.S. PATENT DOCUMENTS

| | | | |
|---|---|---|---|
| 2013/0031346 A1* | 1/2013 | Sakarda | G06F 9/4401 |
| | | | 713/2 |
| 2017/0064599 A1* | 3/2017 | Caine | H04W 84/20 |
| 2017/0286127 A1* | 10/2017 | Artman | G06F 9/4411 |
| 2017/0337070 A1 | 11/2017 | Lee | |

* cited by examiner

SYSTEMS AND METHODS FOR SELF CORRECTING SECURE COMPUTER SYSTEMS

BACKGROUND

The field of the invention relates generally to secure computer systems, and more specifically, to systems and methods for having computer systems securely load to prevent persistent attacks.

Currently, operating systems are executed from persistent memory, which increases vulnerability to persistent attacks. Verifying the integrity of an operating system stored in persistent memory may be resource intensive and time consuming. Specifically, persistent storage may have lengthy random access times compared to volatile memory. Tracking changes to an operating system configuration stored in persistent memory may be similarly resource intensive.

BRIEF DESCRIPTION

In one aspect, a self-correcting secure computer system is provided. The computer system includes a read-only memory (ROM) device, a random access memory (RAM) device, and at least one processor in communication with the ROM device and the RAM device. The at least one processor is programmed to receive an activation signal, retrieve, from the ROM device, data to execute an operating system, and execute, on the RAM device, the operating system based on the data from the ROM device.

In another aspect, a method of operating a self-correcting secure computer system is provided. The self-correcting computer system includes a read-only memory (ROM) device, a random access memory (RAM) device, and at least one processor in communication with the ROM device and the RAM device. The method includes receiving an activation signal, retrieving, from the ROM device, data to execute an operating system, and executing, on the RAM device, the operating system based on the data from the ROM device.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

DETAILED DESCRIPTION

Figure 1:
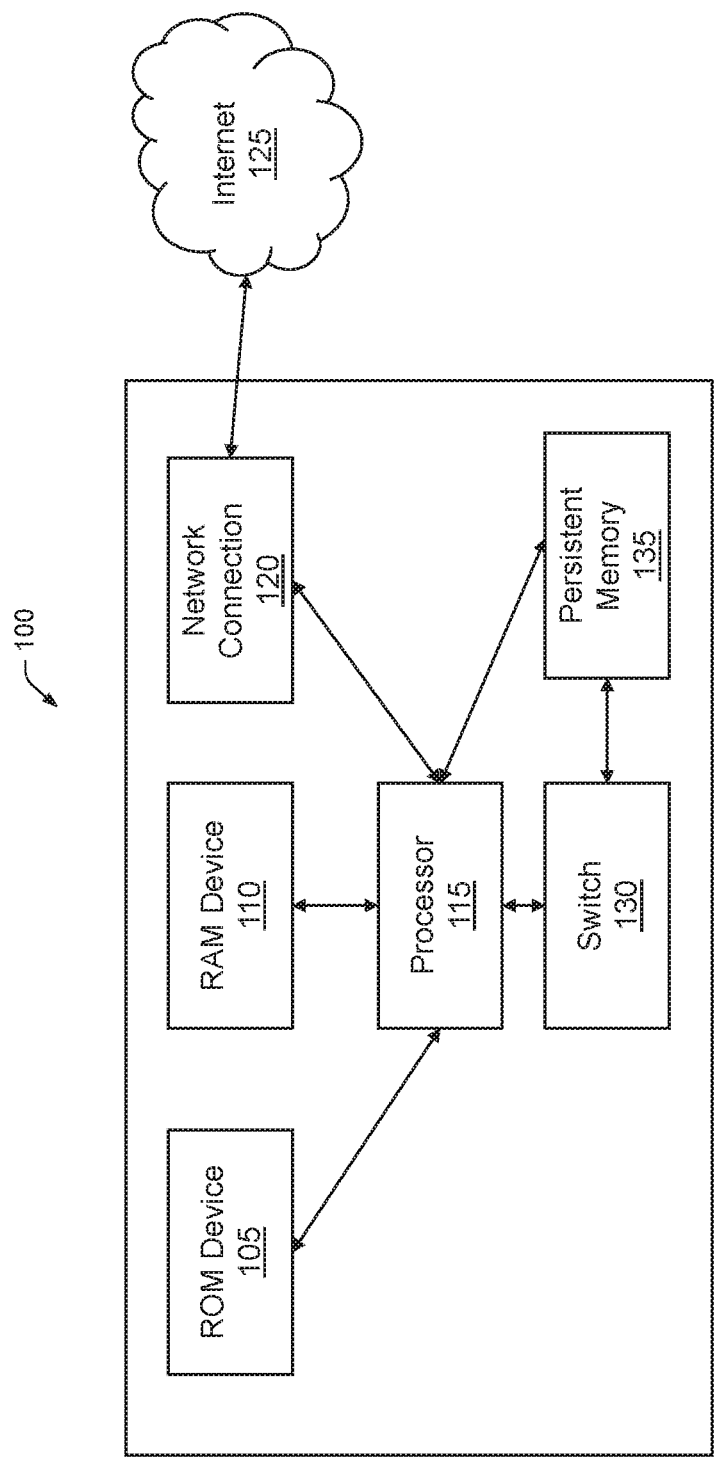
FIG. 1 illustrates a graphical view of an exemplary self-correcting secure computer system in accordance with one embodiment of the disclosure.

The described embodiments enable a self-correcting secure (SCS) computer system to reduce vulnerability to persistent attacks, such as, but not limited to, trojans, viruses, back-door access, keyloggers, and any other cyber-attack that may be performed remotely or via installed malware.

The SCS computer system is configured to load a trusted operating system configuration from a read-only memory into volatile memory during a boot process. In the exemplary embodiment, an operating system configuration is copied from a read-only memory ("ROM") having high sequential read times to a ram-disk stored in volatile random access memory ("RAM"). In this embodiment, the SCS computer system is configured to execute the operating system from the ram-disk. In other words, a clean operating system configuration is loaded from a high integrity storage device to a high performance storage device. The SCS computer system is configured to automatically load the trusted operating system configuration during the boot process, without the need for user intervention or monitoring, and with reduced processing time. Furthermore, the SCS computer system automatically erases the volatile memory thereby clearing all of the data on the RAM device, in response to a shutdown or power interruption.

In certain embodiments, the SCS computer system may selectively enable access to persistent storage, or a portion of the persistent storage. The SCS computer systems may allow write access to only a specific segment of persistent storage. For example, user documents may be saved to persistent storage. Any data not specifically saved to persistent storage will be deleted from the volatile memory when the SCS computer system is powered down, has a power interruption, and/or reboots. This prevents malicious applications from remaining on the SCS computer device and protects the trusted operating system configuration.

In further embodiments, the SCS computer system may allow access to one or more networks, such as the Internet. Prior to allowing access to persistent storage, the SCS computer system disconnects from the one or more networks and prevents reconnection to the one or more networks until after the SCS computer system reboots, which erases the volatile memory.

In still further embodiments, the SCS computer system may include one or more encryption programs or protocols. When a user requests access to the one or more encryption protocols, the SCS computer system first disconnects from the one or more networks. This ensures that information about the encryption is protected, such as encryption logs. While the user can still copy the encrypted files to a removable persistent memory storage device, such as a universal serial bus (USB) memory stick, outside monitoring software is preventing from reporting on the encryption process as all logs and data not specifically stored in the persistent memory will be erased when the SCS computer system shuts down or reboots. Since the network connections are shut down until the SCS computer system restarts, malicious applications and software are prevented from reporting information about the encryption process.

FIG. 1 illustrates a graphical view of an exemplary self-correcting secure (SCS) computer system 100 in accordance with one embodiment of the disclosure.

In the exemplary embodiment, SCS computer system 100 includes a ROM device 105, a RAM device 110, and at least one processor 115.

The ROM device 105 includes read-only memory containing a trusted operating system configuration and associated applications. In the exemplary embodiment, the ROM device 105 has high sequential read times. The RAM device 110 includes volatile memory and is configured to execute the operating system and associated during a boot process. The RAM device 110 is also configured to erase everything in volatile memory thereby clearing all of the data on the RAM device 110, in response to a shutdown or power interruption.

In the exemplary embodiment, the trusted operating system configuration is stored on the ROM device 105. The processor 115 instructs the ROM device 105 to transmit the trusted operating system configuration to a ram-disk stored in the RAM device 110 during the boot process of SCS computer system 100. The RAM device 110 and the processor 115 are configured to execute the operating system from the ram-disk. Therefore, a clean operating system configuration is loaded from a high integrity storage device (ROM device 105) to a high-performance storage device (RAM device 110). The SCS computer system 100 is configured to automatically load the trusted operating system configuration during the boot process, without the need for user intervention or monitoring, and with reduced processing time.

For example, a user may activate the boot sequence of the SCS computer system 100. In some embodiments, the user may activate the boot sequence by pressing a start or on button of the SCS computer system 100. In other embodiments, the user may activate the boot sequence in response to receiving a reboot or restart signal. The SCS computer system 100 loads the operating system from the ROM device 105 into the RAM device 110. The processor 115 executes the operating system, and any associated applications, on the RAM device 110. In this example, the user may generate a document. When the SCS computer system 100 is powered down or rebooted, the document is automatically and permanently erased from the volatile memory.

In at least one further embodiment, the SCS computer system 100 includes one or more network connections 120. In some embodiments, the one or more network connections 120 connect to the Internet 125. In some other embodiments, the one or more network connections 120 connect to a network of other computer devices and/or other SCS computer systems 100. More specifically, SCS computer system 100 may communicatively coupled to the Internet 125 through many network connections 120 including, but not limited to, at least one of a network, such as a local area network (LAN), a wide area network (WAN), or an integrated services digital network (ISDN), a dial-up-connection, a digital subscriber line (DSL), a cellular phone connection, and a cable modem.

In some embodiments, the SCS computer system 100 also includes a switch 130 and persistent memory 135. In some embodiments, the switch 130 may include, but is not limited to, one of a physical switch attached to the computer system and a software switch selectable by a user. The persistent memory 135 may include, but is not limited to, an external hard drive, an internal hard drive, a universal serial bus (USB) memory device, and a hard drive partition. In some further embodiments, the persistent memory 135 is a USB memory device and the switch 130 is activated when the user inserts the USB memory device into a port on the SCS computer system 100. In these embodiments, SCS computer system 100 receives a signal from a USB port that a USB device with persistent memory is being connected. The signal acts as switch 130.

In some further embodiments, the SCS computer system 100 includes a processor, such as processor 115 (shown in FIG. 1), in communication with an internal hard drive. In these embodiments, the internal hard drive is partitioned into two or three partitions. In these embodiments, the first partition is configured to be the ROM device 105. This partition is preloaded with a trusted operating system configuration and is configured to be read-only. The second partition is configured to be the RAM device 110. This partition is configured to execute the operating system and is configured to be volatile memory. In some embodiments, a third partition is configured to be the persistent memory 135.

In one embodiment, a plurality of SCS computer systems 100 are set-up in a cyber-café. When the user is finished with the SCS computer system 100, the system 100 reboots, all of the changes made by the user are deleted and a new copy of the operating system is loaded onto the system 100.

Figure 2:
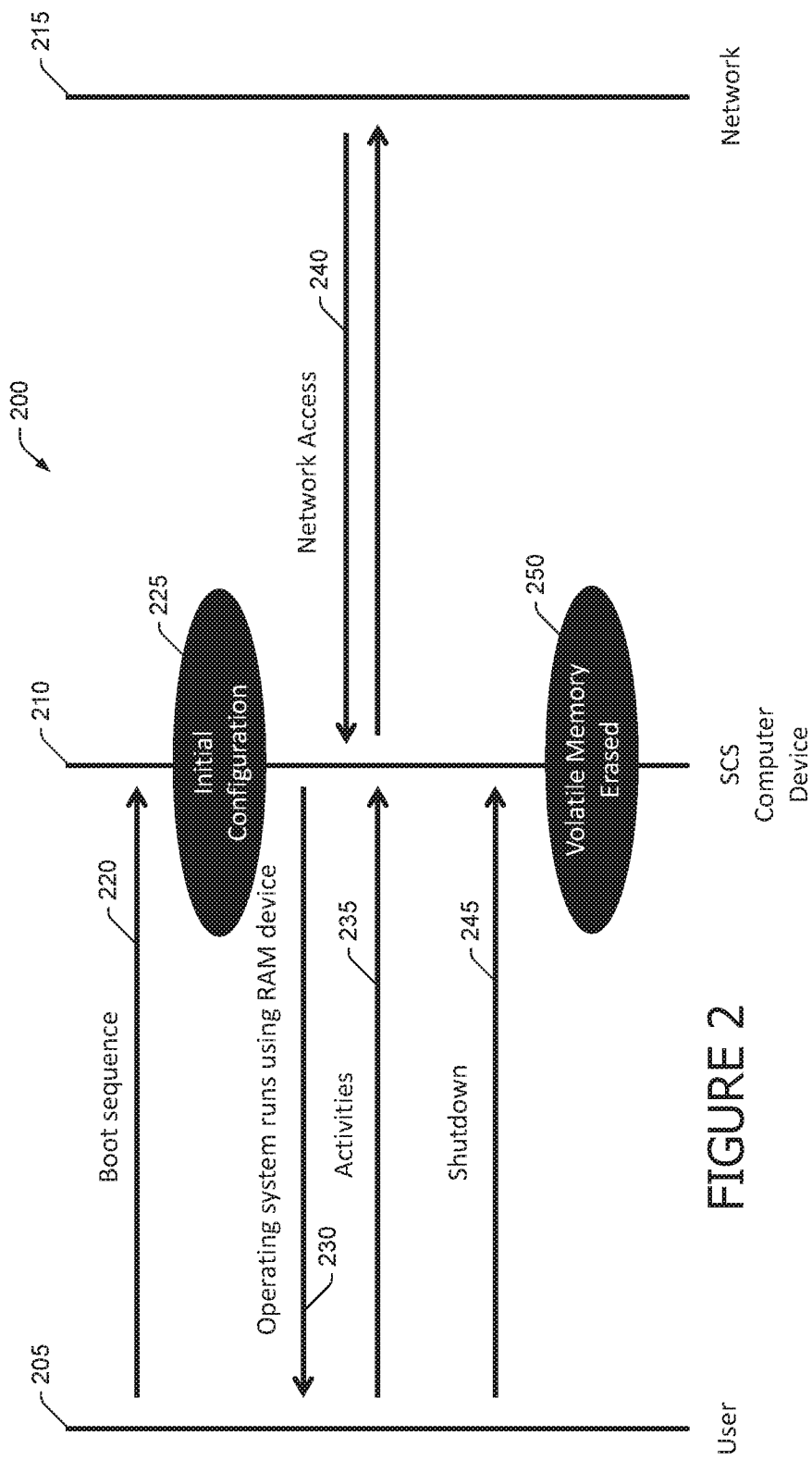
FIG. 2 illustrates a graphical view of the data flows of operating the self-correcting secure computer system shown in FIG. 1 in accordance with one embodiment of the disclosure.

FIG. 2 illustrates a graphical view 200 of the data flows of operating the self-correcting secure computer system 100 (shown in FIG. 1) in accordance with one embodiment of the disclosure.

In the exemplary embodiment, a user 205 is using an SCS computer device 210. The user 205 activates the boot sequence 220 of the SCS computer device 210. The SCS computer device 210 loads the initial configuration 225 of the trusted operating system. In the exemplary embodiments, the trusted operating system is stored on ROM device 105 (shown in FIG. 1) and the initial configuration is loaded onto RAM device 110 (shown in FIG. 1). The operating system runs 230 using the RAM device 110 and allows the user 205 to perform activities 235 on the SCS computer device 210. Examples of activities include, but are not limited to, word processing, playing video games, and network access 240. Network access 240 allows the user 205 to access a network 215, such as the Internet 125 (shown in FIG. 1).

When the SCS computer device 210 receives a shutdown 245 command from the user 205, the SCS computer device 210 erases 250 the volatile memory, such as the RAM device 110 as a part of the shutdown process.

Figure 3:
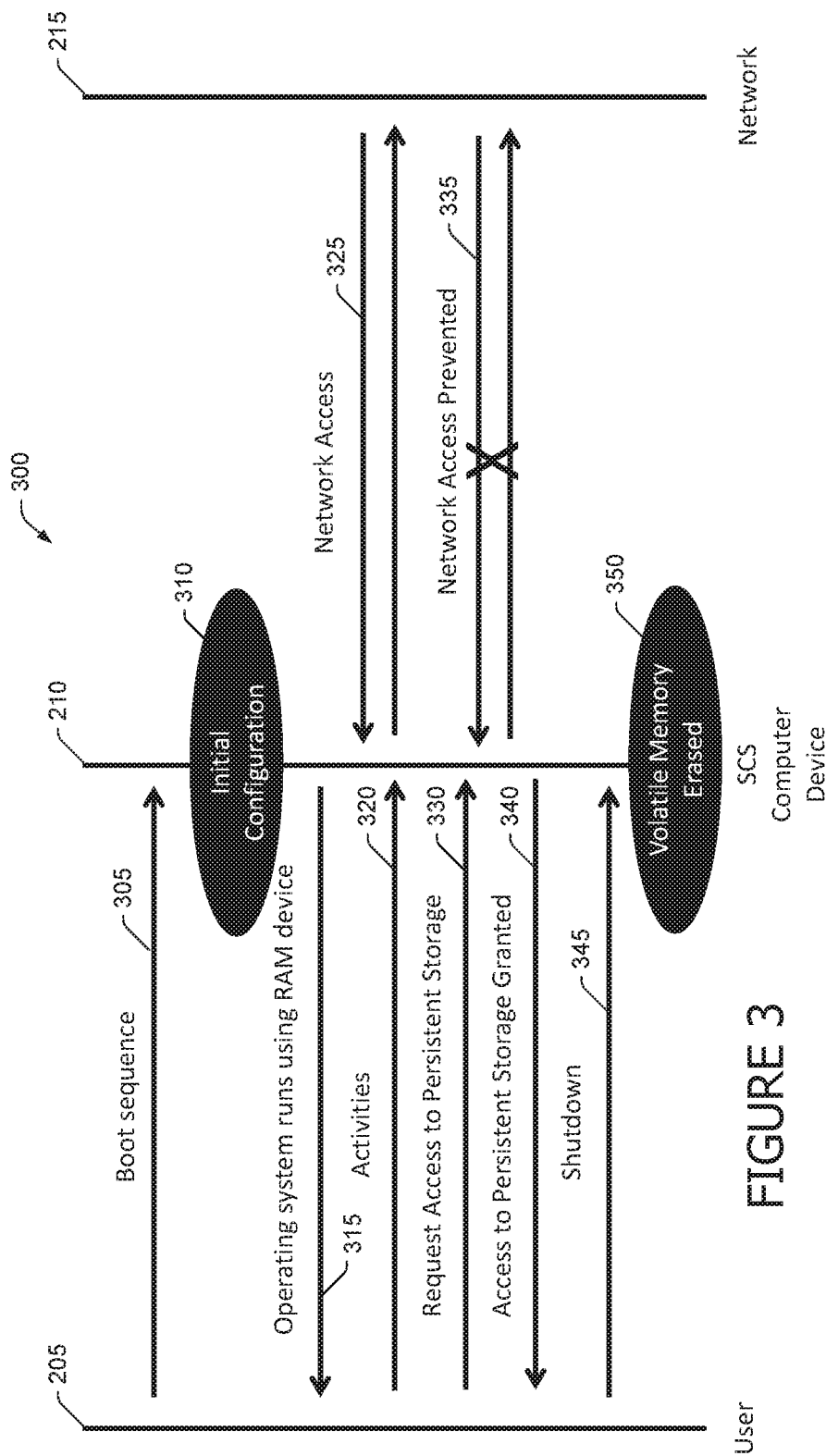
FIG. 3 illustrates a graphical view of the data flows of connecting the self-correcting secure computer system shown in FIG. 1 to a persistent memory in accordance with one embodiment of the disclosure.

FIG. 3 illustrates a graphical view 300 of the data flows of connecting the self-correcting secure computer system 100 (shown in FIG. 1) to a persistent memory 135 (shown in FIG. 1) in accordance with one embodiment of the disclosure.

In the exemplary embodiment, a user 205 is using an SCS computer device 210. The user 205 activates the boot sequence 305 of the SCS computer device 210. The SCS computer device 210 loads the initial configuration 310 of the trusted operating system. In the exemplary embodiments, the trusted operating system is stored on ROM device 105 (shown in FIG. 1) and the initial configuration is loaded onto RAM device 110 (shown in FIG. 1). The operating system runs 315 using the RAM device 110 and allows the user 205 to perform activities 320 on the SCS computer device 210. Examples of activities include, but are not limited to, word processing, playing video games, and network access 325. Network access 325 allows the user 205 to access a network 215, such as the Internet 125 (shown in FIG. 1).

The SCS computer device 210 receives a request for access 330 to persistent storage, such as persistent memory 135 (shown in FIG. 1). The SCS computer device 210 disables network access 335 and prevents any future access to the network 215. After disabling network access 335, the SCS computer device 210 grants 340 the user 205 access to the persistent memory 135.

When the SCS computer device 210 receives a shutdown 345 command from the user 205, the SCS computer device 210 erases 350 the volatile memory, such as the RAM device 110 as a part of the shutdown process.

Figure 4:
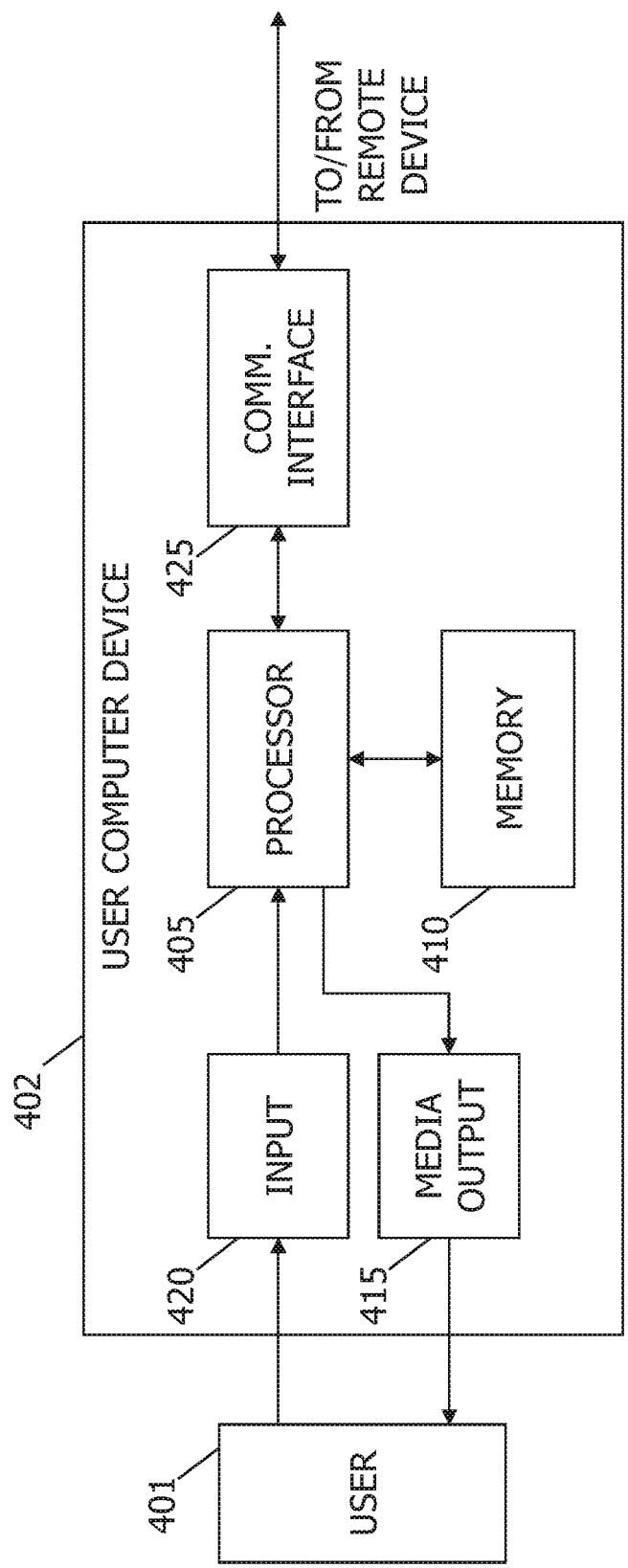
FIG. 4 illustrates an exemplary configuration of a client computer device as shown in FIG. 1, in accordance with one embodiment of the present disclosure.

FIG. 4 depicts an exemplary configuration of client computer device, in accordance with one embodiment of the present disclosure. User computer device 402 may be operated by a user 401. In some embodiments, user 401 is similar to user 205 shown in FIG. 1. User computer device 402 may include, but is not limited to, SCS computer system 100 (shown in FIG. 1) and SCS computer device 210 (shown in FIG. 2). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media. In some embodiments, memory 410 includes one or more of ROM device 105, RAM device 110, and persistent memory 135 (all shown in FIG. 1)

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for browsing the Internet 125 (shown in FIG. 1). In some embodiments, user computer device 402 may include an input device 420 for receiving input from user 401. User 401 may use input device 420 to, without limitation, input requirements such as risk thresholds.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as via network 215 (shown in FIG. 2). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website. A client application may allow user 401 to interact with, for example, Internet 125.

More specifically, user computer device 402 may be communicatively coupled to the Internet 125 through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. User computer device 402 may be any device capable of operating as described herein including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Figure 5:
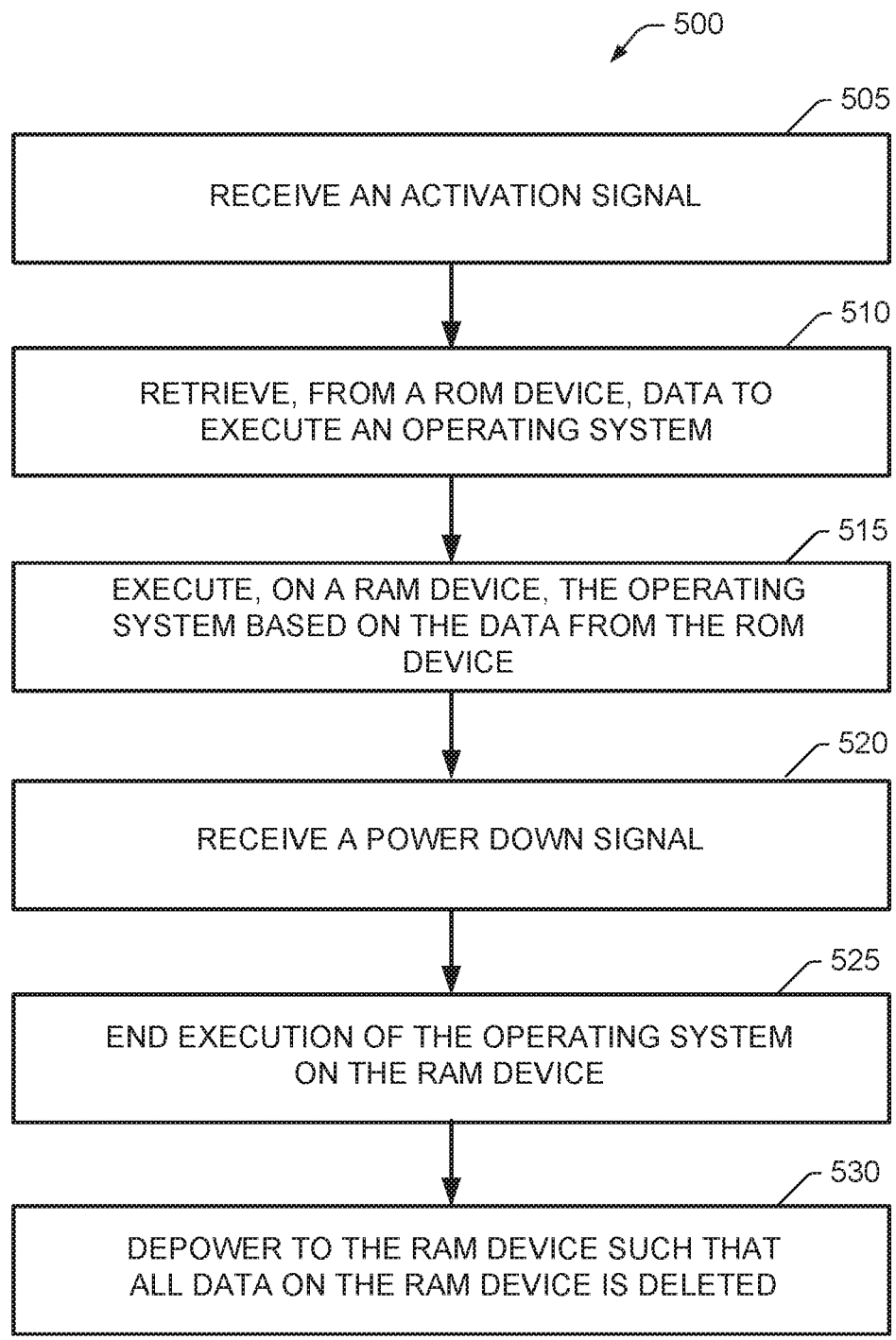
FIG. 5 illustrates a flow chart of a process for operating the self-correcting secure computer system shown in FIG. 1 in accordance with one embodiment of the disclosure.

FIG. 5 illustrates a flow chart of a process 500 for operating the self-correcting secure computer system shown in FIG. 1 in accordance with one embodiment of the disclosure. In the exemplary embodiment, process 500 is performed by SCS computer system 100 (shown in FIG. 1), SCS computer device 210 (shown in FIG. 2), and/or user computer device 402 (shown in FIG. 4).

In the exemplary embodiment, SCS computer system 100 receives 505 an activation signal. In some embodiments, the activation signal is received 505 from an activation switch or on/off button physically attached to the SCS computer system 100. In other embodiments, the activation signal is internal and received 505 in response to a restart or reboot command from the user 205 (shown in FIG. 2). The SCS computer system 100 initiates a boot sequence 220 (shown in FIG. 2). The SCS computer system 100 retrieves 510, from the ROM device 105 (shown in FIG. 1), data to execute an operating system and loads that data onto RAM device 110 (shown in FIG. 1). In the exemplary embodiment, the data is a trusted operating system configuration, such as initial configuration 225 (shown in FIG. 2). The SCS computer system 100 executes 515, on the RAM device 110, the operating system based on the data from the ROM device 105.

In some embodiments, the SCS computer system 100 receives 520 a power down signal. The SCS computer system 100 ends 525 execution of the operating system on the RAM device 110. Then the SCS computer system 100 depowers 530 the RAM device 110 such that all data on the RAM device 110 is deleted. In other embodiments, the SCS computer system 100 receives a reboot signal. The SCS computer system 100 clears all data from the RAM device 110. In some embodiments, the SCS computer system 100 interrupts power to the RAM device 110 to clear the volatile memory. In other embodiments, the SCS computer system 100 transmits a clear signal to the RAM device 110 and the RAM device 110 clears its volatile memory. Once the volatile memory of the RAM device 110 is cleared, the SCS computer system 100 retrieves 510, from the ROM device 105, data to execute the operating system and transmits that data to the RAM device 110. The SCS computer system 100 executes 515, on the RAM device 110, the operating system based on the data from the ROM device 105.

In some embodiments, the SCS computer system 100 includes one or more network connections 120 (shown in FIG. 1) to one or more networks and/or the Internet 125 (shown in FIG. 1). In some of these embodiments, the SCS computer system 100 protects the persistent memory 135

(shown in FIG. 1) from outside influences, such as by being accessed while connected to the Internet 125. In these embodiments, the SCS computer system 100 receives a signal from a first switch 130 (shown in FIG. 1) to access a persistent memory 135. The SCS computer system 100 deactivates the network connection 120. Upon confirmation of the deactivation of the network connection 120, the SCS computer system 100 initiates connection to the persistent memory 135. Examples of persistent memory 135 include, but are not limited to, an external hard drive, an internal hard drive, a universal serial bus memory device, and a hard drive partition. Examples of a switch 130 include, but are not limited to, a physical switch attached to the computer system and a software switch selectable by a user.

In some further embodiments, the SCS computer system 100 receives a signal from a USB port that a USB device with persistent memory 135 is being connected to the SCS computer system 100. In these embodiments, the USB port acts as the switch 130 and the act of plugging the device into the USB port triggers the switch 130. The SCS computer system 100 deactivates the network connections 120. Upon confirmation of the deactivation of the network connections 120, the SCS computer system 100 initiates connection to the USB device.

In some further embodiments, the SCS computer system 100 receives a request from a user to access an encryption suite associated with the SCS computer system 100. The SCS computer system 100 deactivates the network connections 120. Upon confirmation of the deactivation of the network connections, the SCS computer system 100 initiates the encryption suite.

In the above embodiments, the SCS computer system 100 is configured to prevent reactivation of the network connections 120 after the network connections 120 have been deactivated. To be able to use the network connections 120 after deactivation, the user will have to reboot or restart the SCS computer system 100. This erases everything in volatile memory and reloads a new, clean copy of the operating system into the RAM device 110.

In some further embodiments, the SCS computer system 100 receives a switch signal from the user while accessing the Internet 125 via the network connections 120. Based on this signal, the SCS computer system 100 deactivates the network connections 120. Then the SCS computer system 100 adjusts one or more network settings associated with the network connections 120, such as device name and a media access control address. The SCS computer system 100 reactivates the network connections 120 using the one or more adjusted network settings. By changing the network settings and reconnecting to the network, the SCS computer system 100 prevents tracking from cookies and other tracking applications that are monitoring the SCS computer system 100. These tracking applications are configured for the original network settings, and are not able to track the new network settings. Eventually, new cookies and other tracking applications will be loaded on to SCS computer system 100 through the network connections 120. The user may then again trigger the switch signal to reset the network settings and render these additional tracking applications moot.

At least one of the technical solutions to the technical problems provided by this system may include: (i) a secured computer system with a trusted operating system; (ii) automatically deleting cookies and/or malware; (iii) preventing malware from persistently infecting the computer system; (iv) protecting persistent memory from potential remote cyber-attacks; and (v) anonymizing web browsing.

The methods and systems described herein may be implemented using computer programming or engineering techniques including computer software, firmware, hardware, or any combination or subset thereof, wherein the technical effects may be achieved by performing at least one of the following steps: (a) receive an activation signal, (b) retrieve, from a ROM device, data to execute an operating system, (c) execute, on a RAM device, the operating system based on the data from the ROM device, (d) receive a power down signal, (e) end execution of the operating system on the RAM device, (f) depower the RAM device such that all data on the RAM device is deleted, (g) receive a signal from a first switch to access a persistent memory, wherein the persistent memory is one of an external hard drive, an internal hard drive, a universal serial bus memory device, and a hard drive partition, wherein the first switch is one of a physical switch attached to the computer system and a software switch selectable by a user, (h) deactivate the network connection, (i) upon confirmation of the deactivation of the network connection, initiate connection to the persistent memory, (j) receive a signal from a USB port that a USB device with persistent memory is being connected, (k) deactivate the network connection, (l) upon confirmation of the deactivation of the network connection, initiate connection to the USB device, (m) receive a request from a user to access an encryption suite, (n) deactivate the network connection, (o) upon confirmation of the deactivation of the network connection, initiate the encryption suite, (p) prevent reactivation of the network connection after the network connection had been deactivated, (q) receive a switch signal from the user while accessing the Internet via the network connection, (r) deactivate the network connection; (s) adjust one or more network settings, wherein the one or more network settings include a device name and a media access control address, and (t) reactivate the network connection using the one or more adjusted network settings.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A self-correcting secure computer system comprising:
a read-only memory (ROM) device;
a random access memory (RAM) device; and
at least one processor in communication with the ROM device and the RAM device, the at least one processor programmed to:
receive an activation signal;
retrieve, from the ROM device, data to execute an operating system;
execute, on the RAM device, the operating system based on the data from the ROM device;
execute a network connection;
receive a signal from a first switch to access a persistent memory;
deactivate the network connection; and
upon confirmation of the deactivation of the network connection, initiate connection to the persistent memory.

2. The computer system in accordance with claim 1, wherein the at least one processor is further programmed to:
receive a power down signal;
end execution of the operating system on the RAM device; and depower the RAM device such that all data on the RAM device is deleted.

3. The computer system in accordance with claim 1, wherein in the at least one processor is further configured to:
receive a reboot signal;
clear all data from the RAM device;
retrieve, from the ROM device, data to execute an operating system; and
execute, on the RAM device, the operating system based on the data from the ROM device.

4. The computer system in accordance with claim 1, wherein the network connection is to the Internet.

5. The computer system in accordance with claim 1, wherein the persistent memory is one of an external hard drive, an internal hard drive, a universal serial bus memory device, and a hard drive partition.

6. The computer system in accordance with claim 1, wherein the first switch is one of a physical switch attached to the computer system and a software switch selectable by a user.

7. The computer system in accordance with claim 1, wherein the at least one processor is further configured to:
receive a signal from a USB port that a USB device with persistent memory is being connected;
deactivate the network connection; and
upon confirmation of the deactivation of the network connection, initiate connection to the USB device.

8. The computer system in accordance with claim 1, wherein the at least one processor is further configured to:
receive a request from a user to access an encryption suite;
deactivate the network connection; and
upon confirmation of the deactivation of the network connection, initiate the encryption suite.

9. The computer system in accordance with claim 1, wherein the at least one processor is further configured to prevent reactivation of the network connection after the network connection had been deactivated.

10. The computer system in accordance with claim 4, wherein the at least one processor is further configured to:
receive a switch signal from a user while accessing the Internet via the network connection;
deactivate the network connection;
adjust one or more network settings; and
reactivate the network connection using the one or more adjusted network settings.

11. The computer system in accordance with claim 10, wherein the one or more network settings include a device name and a media access control address.

12. The computer system in accordance with claim 1 further comprising a partitioned hard drive, wherein a first partition is configured as the ROM device, a second partition is configured as the RAM device, and a third partition is configured as persistent memory.

13. A method of operating a self-correcting secure computer system comprising a read-only memory (ROM) device, a random access memory (RAM) device, and at least one processor in communication with the ROM device and the RAM device, the method comprising:
receiving an activation signal;
retrieving, from the ROM device, data to execute an operating system; and
executing, on the RAM device, the operating system based on the data from the ROM device;
executing a network connection;
receiving a signal from a first switch to access a persistent memory;
deactivating the network connection; and
upon confirmation of the deactivation of the network connection, initiating connection to the persistent memory.

14. A method in accordance with claim 13 further comprising:
receiving a power down signal;
ending execution of the operating system on the RAM device; and
depowering the RAM device such that all data on the RAM device is deleted.

15. A method in accordance with claim 13 further comprising:
receiving a reboot signal;
clearing all data from the RAM device;
retrieving, from the ROM device, data to execute an operating system; and
executing, on the RAM device, the operating system based on the data from the ROM device.

16. A method in accordance with claim 13, wherein the persistent memory is one of an external hard drive, an internal hard drive, a universal serial bus memory device, and a hard drive partition.

17. A method in accordance with claim 13, wherein the first switch is one of a physical switch attached to the computer system and a software switch selectable by a user.

18. A method in accordance with claim 13, wherein the method further comprises:
receiving a signal from a USB port that a USB device with persistent memory is being connected;
deactivating the network connection; and
upon confirmation of the deactivation of the network connection, initiating connection to the USB device.

19. A method in accordance with claim 13 further comprising preventing reactivation of the network connection after the network connection had been deactivated.

20. A method in accordance with claim 13, wherein the self-correcting secure computer system further comprises a partitioned hard drive, wherein a first partition is configured as the ROM device, a second partition is configured as the RAM device, and a third partition is configured as persistent memory.

* * * * *